United States Patent
Yamane

(10) Patent No.: US 10,079,701 B1
(45) Date of Patent: Sep. 18, 2018

(54) THREE-VALUED SIGNAL GENERATION DEVICE AND THREE-VALUED SIGNAL GENERATION METHOD

(71) Applicant: ANRITSU CORPORATION, Kanagawa (JP)

(72) Inventor: Kazuhiro Yamane, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 15/888,364

(22) Filed: Feb. 5, 2018

(30) Foreign Application Priority Data

Mar. 17, 2017 (JP) ................. 2017-053052

(51) Int. Cl.
*H04L 25/49* (2006.01)
*H04L 25/02* (2006.01)
*H04L 7/027* (2006.01)

(52) U.S. Cl.
CPC ...... *H04L 25/4917* (2013.01); *H04L 25/0276* (2013.01); *H04L 7/027* (2013.01)

(58) Field of Classification Search
CPC .. H04L 25/4917; H04L 25/0276; H04L 7/027
USPC ......................................... 375/293
See application file for complete search history.

(56) References Cited

U.S. PATENT DOCUMENTS

| | | | | |
|---|---|---|---|---|
| 5,469,462 A | * | 11/1995 | Kahlman | G11B 20/10009 360/65 |
| 5,892,474 A | * | 4/1999 | Sugawara | G11B 20/10055 341/200 |
| 2009/0174420 A1 | * | 7/2009 | Ariyama | G01R 31/31928 324/754.08 |
| 2009/0295428 A1 | * | 12/2009 | Hibino | H03K 19/0002 326/59 |
| 2009/0303089 A1 | * | 12/2009 | Chin | H04B 1/71632 341/57 |
| 2011/0006935 A1 | * | 1/2011 | Kawahito | H03M 1/0602 341/126 |
| 2012/0128091 A1 | * | 5/2012 | Fountain | H04L 25/4908 375/295 |
| 2012/0224433 A1 | * | 9/2012 | Mochida | G01R 31/2856 365/185.27 |
| 2013/0147554 A1 | * | 6/2013 | Liu | H03F 3/3022 330/253 |

(Continued)

FOREIGN PATENT DOCUMENTS

JP       2007-274474 A       10/2007

*Primary Examiner* — Helene Tayong
(74) *Attorney, Agent, or Firm* — Pearne & Gordon LLP

(57) ABSTRACT

A three-valued signal generation device includes a first differential amplifier that outputs a differential signal, a second differential amplifier that outputs a differential signal and an inverted differential signal in accordance with a level based on a reference voltage of an inverted pseudo LFPS signal, which is obtained by inverting a logic level of the pseudo LFPS signal, a first signal synthesis unit that synthesizes the differential signal from the first differential amplifier and the inverted differential signal from the second differential amplifier to perform positive logic output of a three-valued LFPS signal, and a second signal synthesis unit that synthesizes the inverted differential signal from the first differential amplifier and the differential signal from the second differential amplifier to perform negative logic output of the three-valued LFPS signal.

4 Claims, 4 Drawing Sheets

(56) References Cited

U.S. PATENT DOCUMENTS

2015/0067209 A1* 3/2015 Liu ..................... H03K 5/22
710/106

* cited by examiner

| Pseudo LFPS | Gating | Ena1 | Ena2 | P1 | P2 | N1 | N2 | Out_P | Out_N |
|---|---|---|---|---|---|---|---|---|---|
| L | H | H | H | L | H | H | L | L | H |
| H | H | H | H | H | L | L | H | H | L |
| X | L | L | L | H | H | L | L | M | M |

H: High level

L: Low level

M: Intermediate level

X: Don't care

THREE-VALUED SIGNAL GENERATION DEVICE AND THREE-VALUED SIGNAL GENERATION METHOD

TECHNICAL FIELD

The present invention relates to a three-valued signal generation device and a three-valued signal generation method for generating a three-valued signal of a Low Frequency Periodic Signaling (LFPS) signal which is specified by a universal serial bus (hereinafter, referred to as a USB) 3.0/3.1/3.2 standard.

BACKGROUND ART

In recent years, in a case where a desired digital communication device is set to be an object to be measured and a bit error rate in the object to be measured is measured, for example, an error rate measurement device as disclosed in Patent Document 1 to be described below has been used. Since this type of error rate measurement device measures to what extent the object to be measured can permit electrical stress, jitter proof strength measurement is performed in which an electrical stress signal having a known pattern is applied as a test signal from a pattern generator, and the test signal is looped back inside or outside the object to be measured, whereby the presence or absence of an error is measured with respect to, for example, the amount of test signal applied, through comparison with the test signal received by an error detector.

Incidentally, a USB is known as one of serial bus standards for connecting a peripheral equipment to an information equipment such as a computer. In negotiation when performing various measurements by using a USB device or a host as an object to be measured, a three-valued LFPS signal specified by a USB 3.0/3.1/3.2 standard is used. The three-valued LFPS signal is a burst signal (tBurst, tRepeat), as illustrated in FIG. 5, which is constituted by pulses having, for example, a period of 20 ns to 100 ns (tPeriod) and a duty ratio of 40% to 60%. Although not particularly shown in the drawing, a signal for determining an operation mode is defined in the USB 3.0/3.1/3.2 standard, inclusive of an LFPS transmission time.

In recent years, in an error rate measurement device, various measurements are executed by making a state diagram of a USB device or a host transition to a loop-back mode during negotiation and causing an error detector to receive an LFPS signal looped back from the USB device or the host along a frame, but a two-valued NRZ signal of a high level and a low level is regarded as a three-valued LFPS signal specified by a USB 3.0/3.1/3.2 standard and is used during the negotiation.

RELATED ART DOCUMENT

Patent Document

[Patent Document 1] JP-A-2007-274474

DISCLOSURE OF THE INVENTION

Problem that the Invention is to Solve

However, the LFPS signal based on the two-valued NRZ signal is a pseudo signal which is not based on the USB 3.0/3.1/3.2 standard, and there is a problem in that an intermediate value between a high level and a low level is not obtained for the LFPS signal and the LFPS signal is not set to be a three-valued signal based on a high level, an intermediate level, and a low level which are specified by the USB 3.0/3.1/3.2 standard. In addition, when the three-valued LFPS signal specified by the USB 3.0/3.1/3.2 standard is generated by a two-valued NRZ signal, a transient response occurs due to AC coupling between an input and an output specified by the USB 3.0/3.1/3.2 standard, and a deviation occurs in a common mode voltage between a burst section and a differential signal depending on a pattern, which leads to the occurrence of a problem in a reception unit of the USB device or the host which is an object to be measured and a problem that it is not possible to normally receive a signal.

For this reason, it is considered that a three-valued LFPS signal specified by the USB 3.0/3.1/3.2 standard is generated by synthesizing two signals using a two-channel pattern generator. However, when two signals are synthesized using the two-channel pattern generator, there is a possibility that glitch noise (whisker-like pulse) is generated due to a phase difference between the two signals, and thus skew adjustment (equal-length wiring) for matching the phases of the two signals with each other is required. In addition, the confirmation of a waveform using a waveform observation device such as an oscilloscope is required in order to match the phases of the two signals with each other, which leads to a problem that a work burden on a user increases. In addition, a high-cost 2-channel pattern generator is absolutely necessary for the signal synthesis, which leads to a problem that the overall cost increases by that amount.

Consequently, the invention is contrived in view of the above-described problems, and an object thereof is to provide a three-valued signal generation device and a three-valued signal generation method which are capable of generating a three-valued signal of an LFPS signal, which is specified by a USB 3.0/3.1/3.2 standard, at a low cost.

Means for Solving the Problem

In order to accomplish the above-described object, according to an aspect of the invention, there is provided a three-valued signal generation device that generates a three-valued Low Frequency Periodic Signaling (LFPS) signal by using a pseudo LFPS signal which is a two-valued Non Return to Zero (NRZ) signal and a two-valued enable signal corresponding to a burst section of the three-valued LFPS signal having voltage levels of a low level, a high level, and an intermediate level, the three-valued signal generation device including a first differential amplifier that includes a first enable terminal to which the enable signal is input, a first input terminal to which the pseudo LFPS signal is input, a first output terminal from which a first differential signal is output, and a first inverted output terminal from which a first inverted differential signal obtained by inverting a voltage level of the first differential signal is output, a logic of the first differential signal being same as a logic of the pseudo LFPS signal based on a reference voltage of the pseudo LFPS signal when the enable signal is at a disable logic level, and outputs the logic of the first differential signal being at a positive logic level regardless of the logic of the pseudo LFPS signal when the enable signal is at an enable logic level, a second differential amplifier that includes a second enable terminal to which the enable signal is input, a second input terminal to which the pseudo LFPS signal is input, a second output terminal from which a second differential signal is output, and a second inverted output terminal from which a second inverted differential signal obtained by inverting a voltage level of the second differential signal is output, a logic of the second differential signal being same as a logic of an inverted pseudo LFPS signal, which is obtained by inverting a voltage level of the pseudo LFPS signal, based on the reference voltage of the pseudo LFPS signal when the enable signal is at a disable logic level, and the logic of the second differential signal being at a positive logic level regardless of the logic of the pseudo LFPS signal when the enable signal is at an enable logic level, a first signal synthesis unit that synthesizes the first differential signal from the first differential amplifier and the second inverted differential signal from the second differential amplifier to perform positive logic output of the three-valued LFPS signal, and a second signal synthesis unit that synthesizes the first inverted differential signal from the first differential amplifier and the second differential signal from the second differential amplifier to perform negative logic output of the three-valued LFPS signal.

In the three-valued signal generation device according to the aspect, each of the first differential amplifier and the second differential amplifier may be a differential amplification circuit with an output enable function.

In the three-valued signal generation device according to the aspect, each of the first signal synthesis unit and the second signal synthesis unit is, for example, a power combiner.

According to another aspect of the invention, there is provided a three-valued signal generation method of generating a three-valued Low Frequency Periodic Signaling (LFPS) signal by using a pseudo LFPS signal which is a two-valued Non Return to Zero (NRZ) signal and a two-valued enable signal corresponding to a burst section of the three-valued LFPS signal having voltage levels of a low level, a high level, and an intermediate level, the three-valued signal generation method including inputting the enable signal to a first enable terminal of a first differential amplifier, inputting the pseudo LFPS signal to a first input terminal of the first differential amplifier, outputting a first differential signal from a first output terminal of the first differential amplifier a logic of the first differential signal being same as a logic of the pseudo LFPS signal when the enable signal is at a disable logic level, and the logic of the first differential signal being at a positive logic level regardless of the logic of the pseudo LFPS signal when the enable signal is at an enable logic level, outputting a first inverted differential signal, which is obtained by inverting a voltage level of the first differential signal, from a first inverted output terminal of the first differential amplifier, inputting the enable signal to a second enable terminal of a second differential amplifier, inputting the pseudo LFPS signal to a second input terminal of the second differential amplifier, outputting a second differential signal from a second output terminal of the second differential amplifier, a logic of the second differential signal being same as a logic of an inverted pseudo LFPS signal, which is obtained by inverting a voltage level of the pseudo LFPS signal, based on the reference voltage of the pseudo LFPS signal when the enable signal is at a disable logic level, and the logic of the second differential signal at a positive logic level regardless of logic of the pseudo LFPS signal when the enable signal is at an enable logic level, outputting a second inverted differential signal, which is obtained by inverting a voltage level of the second differential signal, from a second inverted output terminal of the second differential amplifier, synthesizing the first differential signal from the first differential amplifier and the second inverted differential signal from the second differential amplifier to perform positive logic output of the three-valued LFPS signal, and synthesizing the first inverted differential signal from the first differential amplifier and the second differential signal from the second differential amplifier to perform negative logic output of the three-valued LFPS signal.

Advantage of the Invention

According to the invention, it is possible to realize a three-valued LFPS signal, which is specified by a USB 3.0/3.1/3.2 standard, by a low-cost configuration using a one-channel pattern generator.

BEST MODE FOR CARRYING OUT THE INVENTION

Hereinafter, a mode for carrying out the invention will be described in detail with reference to the accompanying drawings.

The invention relates to a three-valued signal generation device and a three-valued signal generation method for generating an LFPS signal (low frequency burst signal) having three values of a low level, a high level, and an intermediate level which are specified by a USB 3.0/3.1/3.2 standard by using a two-valued NRZ signal output of an AUX Output (pseudo LFPS signal output) and a Gating Output (intermediate value control signal output) which are generated by a one-channel pattern generator.

Furthermore, the pattern generator includes an AUX Output and can output a frequency-divided clock synchronized with a bit rate or a timing signal synchronized with a period of a pulse pattern length. The AUX Output generates a signal, for example, by programmable logic, and generates and outputs a pseudo LFPS signal in the invention.

In addition, the pattern generator includes a Gating Output, and can output a timing signal indicating a Burst signal period. The Gating Output generates a signal, for example, by programmable logic, and generates and outputs an intermediate value control signal in the invention.

Figure 1:
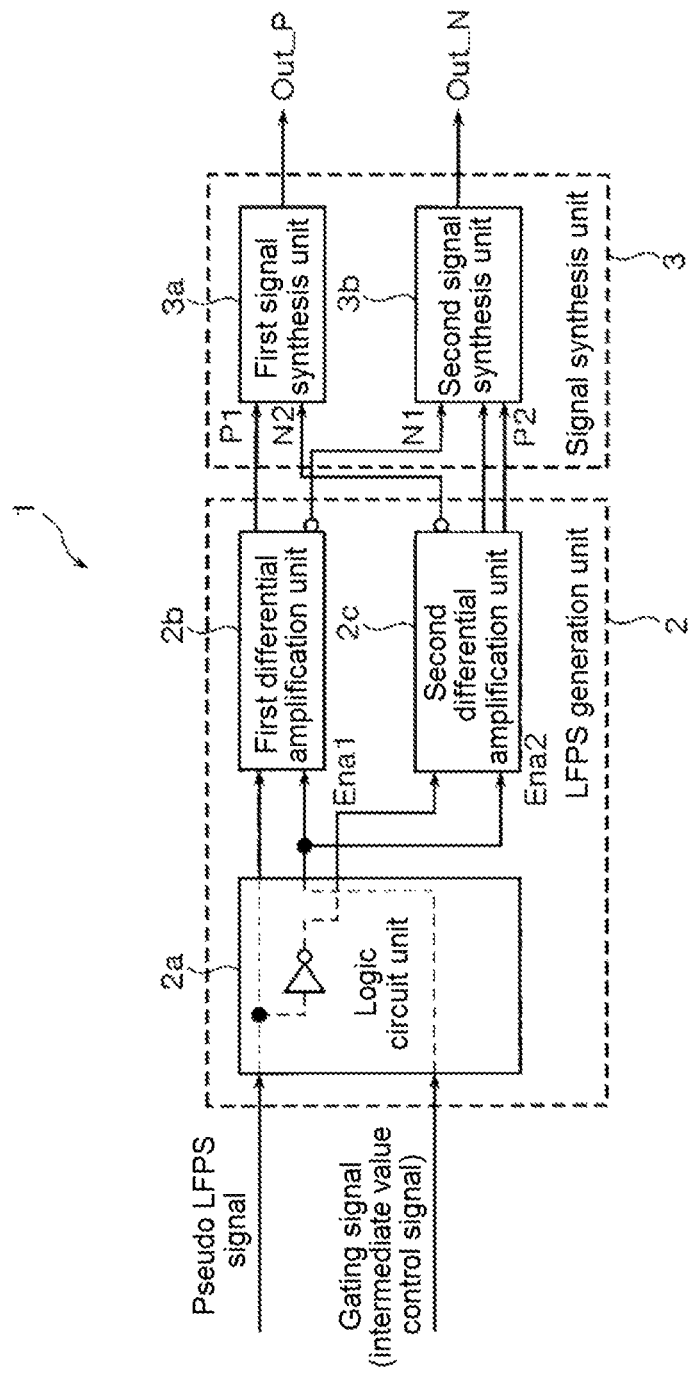
FIG. 1 is a block configuration diagram of a three-valued signal generation device according to the invention.

As illustrated in FIG. 1, a three-valued signal generation device 1 according to this embodiment is schematically configured to include an LFPS generation unit 2 and a signal synthesis unit 3 in order to generate a three-valued LFPS signal specified by a USB 3.0/3.1/3.2 standard.

The LFPS generation unit 2 is configured to include a logic circuit unit 2a, a first differential amplification unit 2b, and a second differential amplification unit 2c.

The logic circuit unit 2a is provided at the first stage of the three-valued signal generation device 1, and is constituted by, for example, an ECL logic. A pseudo LFPS signal and an intermediate value control signal (hereinafter, referred to as a Gating signal) are input to the logic circuit unit 2a.

As the pseudo LFPS signal and the Gating signal, an AUX Output (pseudo LFPS signal output) and a Gating Output (intermediate value control signal output) generated by, for example, a well-known one-channel pattern generator of the related art are used.

Figures 4, 5:
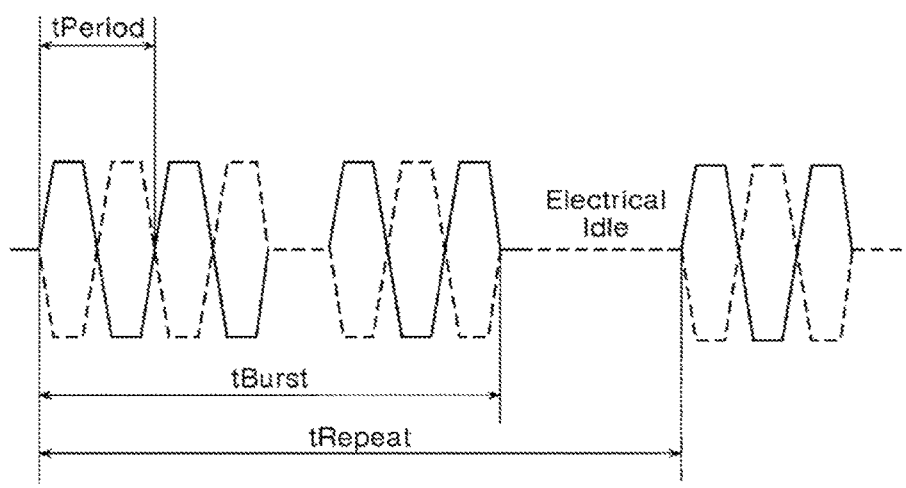
FIG. 4 is a diagram illustrating an example of a logical value table of the three-valued signal generation device according to the invention.
FIG. 5 is a diagram illustrating an LFPS signal specified by a USB 3.0/3.1/3.2 standard.

The pseudo LFPS signal is a signal which is generated from a two-valued NRZ signal of a high level H and a low level L and is constituted by a low level: L, a high level: H, and Don't care: X, as illustrated in FIG. 4. In addition, the Gating signal is a signal indicating a burst section of a three-valued LFPS signal specified by a USB 3.0/3.1/3.2 standard and is constituted by a low level: L or a high level: H. In this example, the Gating signal is described on the assumption that the low level: L indicates a burst section, but the high level: H may indicate a burst section. In this example, the Gating signal, that is, an intermediate value control signal is described on the assumption that the low level: L indicates a burst section and the burst section is equivalent to a logic level of enable.

The logic circuit unit 2a outputs the pseudo LFPS signal and the Gating signal to the first differential amplification unit 2b. In addition, the logic circuit unit 2a outputs an inverted pseudo LFPS signal, which is obtained by inverting a logic level of the pseudo LFPS signal, and the Gating signal to the second differential amplification unit 2c.

The first differential amplification unit 2b is connected to the subsequent stage of the logic circuit unit 2a, and is constituted by a driver to which the logic is fixed, for example, a differential amplification circuit with an output enable function such as a differential driver amplifier. In this manner, the differential amplification unit can be constituted by a differential amplifier. The first differential amplification unit 2b includes a first input terminal to which a pseudo LFPS signal is input and an enable terminal, and is configured such that the pseudo LFPS signal is input to the first input terminal through the logic circuit unit 2a and the Gating signal is input to the enable terminal as an enable signal Ena1 through the logic circuit unit 2a.

The first differential amplification unit 2b outputs a differential signal P1 and an inverted differential signal N1, which is obtained by inverting the logic level of the differential signal P1, so as to be set to a predetermined output voltage in consideration of a loss in the subsequent-stage signal synthesis unit 3, in accordance with whether the level of the pseudo LFPS signal which is input to the first input terminal is high or low on the basis of a reference voltage so as to fixedly output a logic, for example, when enable is turned off (Gating signal is at a high level: H). Meanwhile, the first differential amplification unit 2b in this example amplifies a difference voltage between the pseudo LFPS signal and the reference voltage not shown in the drawing. Meanwhile, the first differential amplification unit 2b includes a first output terminal that outputs a differential signal P1 and a first inverted output terminal that outputs the inverted differential signal N1.

That is, the first differential amplification unit 2b outputs the differential signal P1 at a low level: L to a first signal synthesis unit 3a to be described later and outputs the inverted differential signal N1 at a high level: H to a second signal synthesis unit 3b to be described later when the pseudo LFPS signal at a low level: L is input to the first input terminal and the enable signal Ena1 at a high level: H is input to the enable terminal, as illustrated in a logical value table of FIG. 4.

In addition, the first differential amplification unit 2b outputs the differential signal P1 at a high level: H to the first signal synthesis unit 3a to be described later and outputs the inverted differential signal N1 at a low level: L to the second signal synthesis unit 3b to be described later when the pseudo LFPS signal at a high level: H is input to the first input terminal and the enable signal Ena1 at a high level: H is input to the enable terminal, as illustrated in the logical value table of FIG. 4.

Further, the first differential amplification unit 2b outputs the differential signal P1 at a high level: H to the first signal synthesis unit 3a to be described later and outputs the inverted differential signal N1 at a low level: L to the second signal synthesis unit 3b to be described later when the pseudo LFPS signal of Don't care: X is input to the first input terminal and the enable signal Ena1 at a low level: L is input to the enable terminal, as illustrated in the logical value table of FIG. 4.

The second differential amplification unit 2c is connected to the subsequent stage of the logic circuit unit 2a in parallel with the first differential amplification unit 2b, and is constituted by a driver to which the logic is fixed, for example, a differential amplification circuit with an output enable function such as a differential driver amplifier, similar to the first differential amplification unit 2b. The second differential amplification unit 2c includes a second input terminal to which an inverted pseudo LFPS signal is input and an enable terminal, and is configured such that the inverted pseudo LFPS signal is input to the second input terminal through the logic circuit unit 2a and the Gating signal is input to the enable terminal as an enable signal Ena2 through the logic circuit unit 2a.

The second differential amplification unit 2c outputs a differential signal P2 and an inverted differential signal N2, which is obtained by inverting the logic level of the differential signal P2, so as to be set to a predetermined output voltage in consideration of a loss in the subsequent-stage signal synthesis unit 3, in accordance with whether the level of the inverted pseudo LFPS signal which is input to the second input terminal is high or low on the basis of a reference voltage so as to fixedly output a logic, for example, when enable is turned off (Gating signal is at a high level: H). Meanwhile, the second differential amplification unit 2c in this example amplifies a difference voltage between the pseudo LFPS signal and the reference voltage not shown in the drawing. Meanwhile, the second differential amplification unit 2c includes a second output terminal that outputs the differential signal P2 and a second inverted output terminal that outputs the inverted differential signal N2.

That is, the second differential amplification unit 2c outputs the differential signal P2 at a high level: H to the second signal synthesis unit 3b to be described later and outputs the inverted differential signal N2 at a low level: L to the first signal synthesis unit 3a to be described later when the pseudo LFPS signal at a low level: L is input to the second input terminal and the enable signal Ena2 at a high level: H is input to the enable terminal, as illustrated in the logical value table of FIG. 4.

In addition, the second differential amplification unit 2c outputs the differential signal P2 at a low level: L to the second signal synthesis unit 3b to be described later and outputs the inverted differential signal N2 at a high level: H to the first signal synthesis unit 3a to be described later when the pseudo LFPS signal at a high level: H is input to the second input terminal and the enable signal Ena2 at a high level: H is input to the enable terminal, as illustrated in the logical value table of FIG. 4.

Further, the second differential amplification unit 2c outputs the differential signal P2 at a high level: H to the second signal synthesis unit 3b to be described later and outputs the inverted differential signal N2 at a low level: L to the first signal synthesis unit 3a to be described later when the pseudo LFPS signal of Don't care: X is input to the second input terminal and the enable signal Ena2 at a low level: L is input to the enable terminal, as illustrated in the logical value table of FIG. 4. That is, the second differential amplification unit 2c outputs the differential signal P2 (=P1) and the inverted differential signal N2 (=N1) at the same logic level as that of the first differential amplification unit 2b when the enable signal Ena2 at a low level: L is input to the enable terminal.

Furthermore, it is further preferable that two sets of differential amplification units of the first differential amplification unit 2b and the second differential amplification unit 2c are connected to the logic circuit unit 2a through equal-length wirings.

With a configuration in which the logic level of the pseudo LFPS signal is inverted and the signal having the inverted level is input to the second differential amplification unit 2c, it is possible to omit the configuration of the logic circuit unit 2a. In this case, it is necessary to input the pseudo LFPS signal and the inverted pseudo LFPS signal by using equal-length cables in order to strictly manage the skew between the differential signals which are respectively input to the first differential amplification unit 2b and the second differential amplification unit 2c. Meanwhile, the configuration of the logic circuit unit 2a can be replaced with a differential amplifier.

The signal synthesis unit 3 is connected to the next stage of the LFPS generation unit 2, and is configured to include the first signal synthesis unit 3a and the second signal synthesis unit 3b.

The first signal synthesis unit 3a is constituted by, for example, a power combiner or the like. The differential signal P1 from the first differential amplification unit 2b and the inverted differential signal N2 from the second differential amplification unit 2c are input to the first signal synthesis unit 3a, the differential signal P1 and the inverted differential signal N2 are synthesized, and positive logic output is performed on a three-valued LFPS signal of a low level: L, a high level: H, and an intermediate level: M which are specified by a USB 3.0/3.1/3.2 standard in accordance with the level states of the differential signal P1 and the inverted differential signal N2.

The second signal synthesis unit 3b is constituted by, for example, a power combiner or the like, similar to the first signal synthesis unit 3a. The differential signal N1 from the first differential amplification unit 2b and the inverted differential signal P2 from the second differential amplification unit 2c are input to the second signal synthesis unit 3b, the differential signal N1 and the inverted differential signal P2 are synthesized, and negative logic output is performed on a three-valued LFPS signal of a low level: L, a high level: H, and an intermediate level: M which are specified by a USB 3.0/3.1/3.2 standard in accordance with the level states of the differential signal N1 and the inverted differential signal P2.

In the signal synthesis unit 3 (3a, 3b), in a case where low level: L is input as P1/P2 and low level: L is input as N2/N1, signal synthesis is performed on the low level: L and is output. In a case where high level: H is input as P1/P2 and high level: H is input as N2/N1, signal synthesis is performed on the high level: H and is output. In a case where high level: H is input as P1/P2 and low level: L is input as N2/N1 or in a case where low level: L is input as P1/P2 and high level: H is input as N2/N1, signal synthesis is performed on the intermediate level: M and is output. In the invention, signal synthesis is performed on the high level: H as P1/P2 and the low level: L as N2/N1 to realize the intermediate level: M.

Furthermore, it is further preferable that two sets of differential amplification units 2b and 2c and the signal synthesis unit 3 are connected to each other through equal-length wirings.

Figure 2:
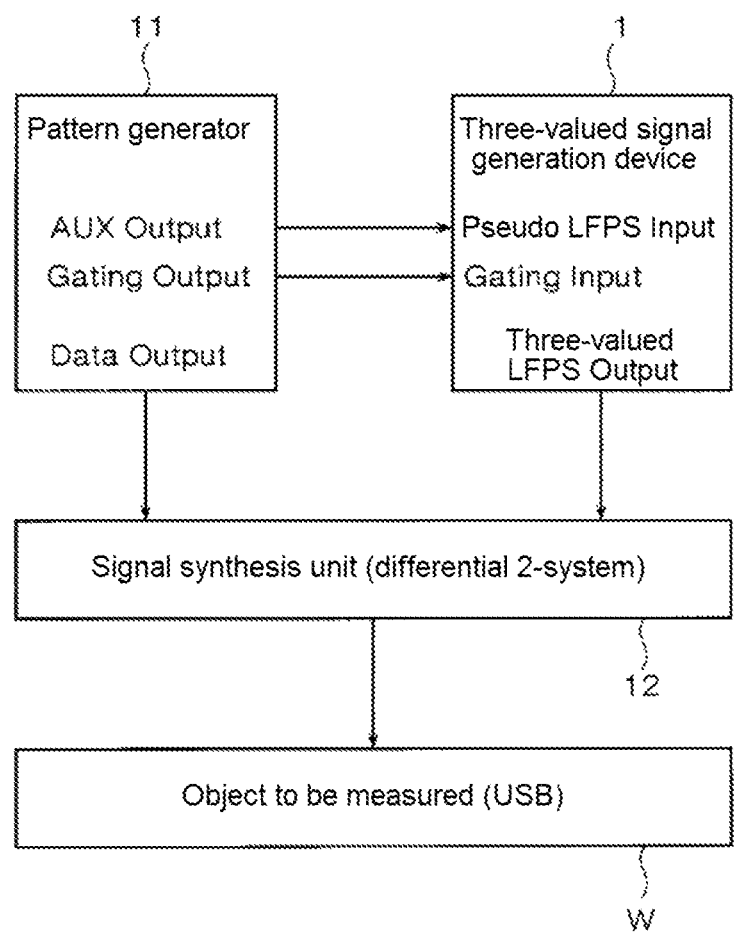
FIG. 2 is a diagram illustrating a configuration example when performing the measurement of an object to be measured.

The three-valued signal generation device 1 configured as described above is connected to a pattern generator 11 when measuring an object to be measured W as illustrated in FIG. 2, and a three-valued LFPS signal and a main signal of the pattern generator 11 are synthesized by the signal synthesis unit 12 to be used for the measurement of a USB as the object to be measured W. Furthermore, two systems of the signal synthesis unit 12 are required for a differential signal. In addition, it is necessary to perform signal synthesis by a power combiner (loss of 6 dB), and thus the deterioration of a final output amplitude is compensated for by using a differential driver amplifier having a high amplitude output.

Figure 3:
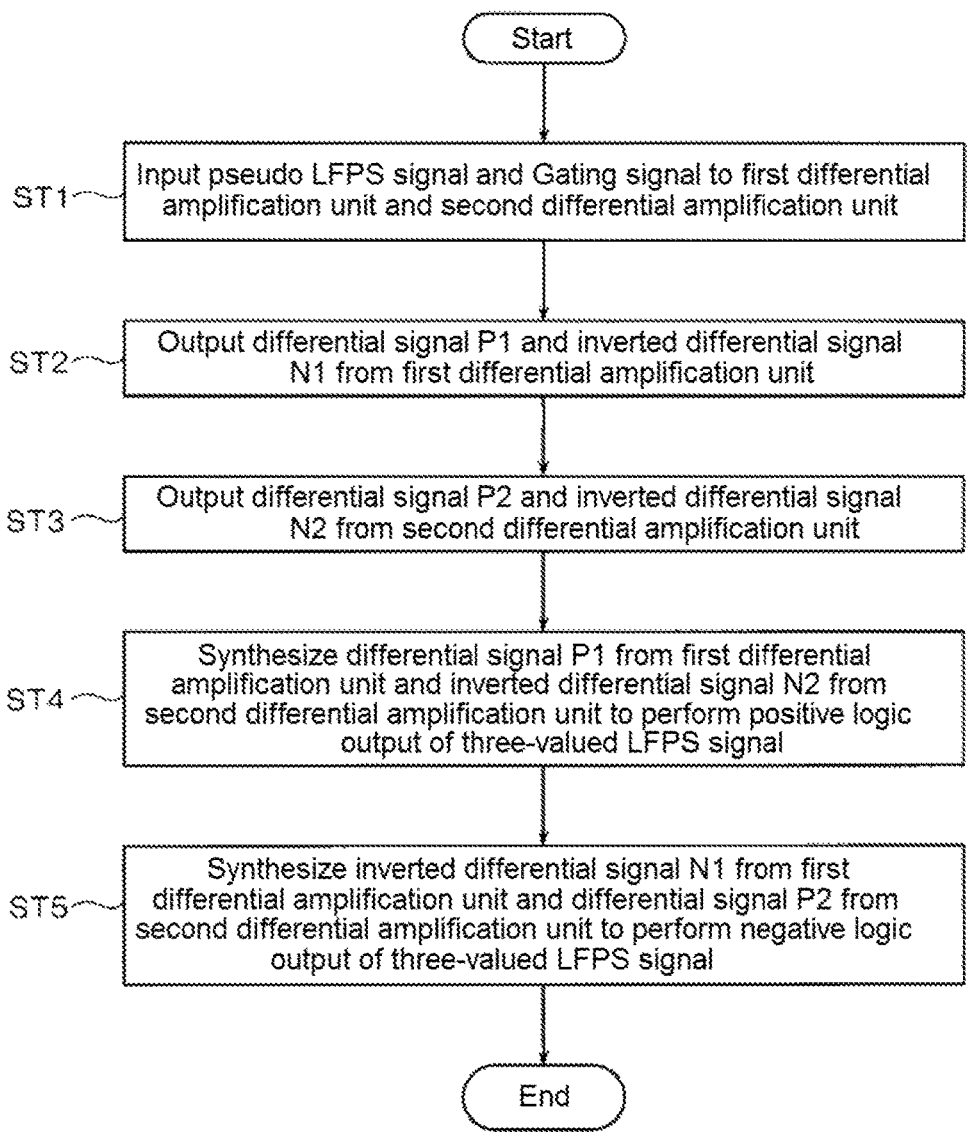
FIG. 3 is a flowchart illustrating a three-valued signal generation method according to the invention.

Next, a three-valued signal generation method using the three-valued signal generation device 1 configured as described will be described with reference to a flowchart of FIG. 3.

First, a pseudo LFPS signal and a Gating signal are generated and output from a one-channel pattern generator, the pseudo LFPS signal is input to the input terminal of each of the first differential amplification unit 2b and the second differential amplification unit 2c, and the Gating signal is input to the enable terminal of each of the first differential amplification unit 2b and the second differential amplification unit 2c (ST1).

The first differential amplification unit 2b outputs the differential signal P1 and the inverted differential signal N1 in accordance with a level based on a reference voltage of the pseudo LFPS signal so as to fixedly output a logic when the Gating signal is at a desired level (for example, low level: L) (ST2).

In addition, the second differential amplification unit 2c outputs the differential signal P2 and the inverted differential signal N2 in accordance with a level based on a reference voltage of an inverted pseudo LFPS signal, which is obtained by inverting the logic level of the pseudo LFPS signal, so as to fixedly output a logic when the Gating signal is at a desired level (for example, low level: L) (ST3).

The first signal synthesis unit 3a synthesizes the differential signal P1 from the first differential amplification unit 2b and the inverted differential signal N2 from the second differential amplification unit 2c to perform positive logic output of a three-valued LFPS signal specified by a USB 3.0/3.1/3.2 standard (ST4).

In addition, the second signal synthesis unit 3b synthesizes the inverted differential signal N1 from the first differential amplification unit 2b and the differential signal P2 from the second differential amplification unit 2c to perform negative logic output of a three-valued LFPS signal specified by a USB 3.0/3.1/3.2 standard (ST5).

Next, the operation of the three-valued signal generation device 1 configured as described above will be described with reference to the logical value table of FIG. 4. Furthermore, the positive or negative of the logical value table of FIG. 4 may be appropriately changed in accordance with a device to be used.

The logic circuit unit 2a inputs the pseudo LFPS signal to the first differential amplification unit 2b in a non-inversion manner and inputs the pseudo LFPS signal to the second differential amplification unit 2c in an inversion manner when the pseudo LFPS signal and the Gating signal are input by a two-valued NRZ signal output of an AUX Output (pseudo LFPS signal output) and a Gating Output (intermediate value control signal output) from the pattern generator 11 of FIG. 2. In addition, the logic circuit unit 2a inputs the Gating signal to the enable terminal of each of the first differential amplification unit 2b and the second differential amplification unit 2c as the enable signals Ena1 and Ena2.

The first differential amplification unit 2b outputs the differential signal P1 to the first signal synthesis unit 3a and outputs the inverted differential signal N1, which is obtained by inverting the logic level of the differential signal P1, to the second signal synthesis unit 3b. In addition, the second differential amplification unit 2c outputs the differential signal P2 to the second signal synthesis unit 3b and outputs the inverted differential signal N2, which is obtained by inverting the logic level of the differential signal P2, to the first signal synthesis unit 3a.

The first signal synthesis unit 3a performs positive logic output of the LFPS signal at a low level: L specified by a USB 3.0/3.1/3.2 standard when the differential signal P1 at a low level: L is input from the first differential amplification unit 2b and the inverted differential signal N2 at a low level: L is input from the second differential amplification unit 2c (Out_P). In this case, the second signal synthesis unit 3b performs negative logic output of the LFPS signal at a high level: H specified by a USB 3.0/3.1/3.2 standard when the differential signal P2 at a high level: H is input from the second differential amplification unit 2c and the inverted differential signal N1 at a high level: H is input from the first differential amplification unit 2b (Out_N).

In addition, the first signal synthesis unit 3a performs positive logic output of the LFPS signal at a high level: H specified by a USB 3.0/3.1/3.2 standard when the differential signal P1 at a high level: H is input from the first differential amplification unit 2b and the inverted differential signal N2 at a high level: H is input from the second differential amplification unit 2c (Out_P). In this case, the second signal synthesis unit 3b performs negative logic output of the LFPS signal at a low level: L specified by a USB 3.0/3.1/3.2 standard when the differential signal P2 at a low level: L is input from the second differential amplification unit 2c and the inverted differential signal N1 at a low level: L is input from the first differential amplification unit 2b (Out_N).

Further, the first signal synthesis unit 3a performs positive logic output of the LFPS signal at an intermediate level: M specified by a USB 3.0/3.1/3.2 standard when the differential signal P1 at a high level: H is input from the first differential amplification unit 2b and the inverted differential signal N2 at a low level: L is input from the second differential amplification unit 2c (Out_P). In this case, the second signal synthesis unit 3b performs negative logic output of the LFPS signal at an intermediate level: M specified by a USB 3.0/3.1/3.2 standard when the differential signal P2 at a low level: L is input from the second differential amplification unit 2c and the inverted differential signal N1 at a high level: H is input from the first differential amplification unit 2b (Out_N).

In this manner, according to this embodiment, it is possible to correctly generate a three-valued LFPS signal specified by a USB 3.0/3.1/3.2 standard and to provide a three-valued signal generation device with a suppressed overall cost, with a low-cost configuration using a two-valued NRZ signal (pseudo LFPS signal) and a Gating signal (intermediate value control signal) which are output by a one-channel pattern generator.

In addition, it is possible to eliminate labor for strict skew adjustment when a margin is given to a timing by making the Gating signal fast so that skew adjustment between a pseudo LFPS signal input and the Gating signal becomes unnecessary by performing three-valued signal control on the pseudo LFPS signal by the Gating signal. Thereby, it is not necessary to perform the confirmation of a waveform using a waveform observation device such as an oscilloscope, and thus an unnecessary work burden is also not imposed on a user. At this time, it is possible to suppress propagation of an unnecessary signal by using a differential amplification unit with an output enable function as the differential amplification units 2b and 2c, and to prevent glitch noise from being generated.

Further, it is possible to compensate for a phase difference by considering a wiring length in advance, a propagation delay of a device, and the like during design with respect to skew during signal synthesis. In general, the degree of request for a waveform quality required for an LFPS signal is lower than that of a pattern generator, and thus it is possible to use a low-cost versatile high speed device at a low cost. In addition, when a three-valued LFPS signal based on a USB 3.0/3.1/3.2 standard is generated by a two-valued NRZ signal, there is a concern that a transient response occurs in an AC coupling condition required in the standard and a USB device or a host misses the LFPS signal within a signal transmission period until the transient response between differentials transitions to a steady state, but it is possible to avoid the risk thereof.

As described above, the best modes of the three-valued signal generation device and the three-valued signal generation method according to the invention have been described, but the invention is not limited by the description and the drawings based on the modes. For example, the invention can be applied in the category of an inverted logic, which is obtained by inverting a low level and a high level, or a modification. That is, it is a matter of course that other modes, examples, and an operation technique, and the like which are carried out by those skilled in the art on the basis of the modes are all included in the category of the invention.

DESCRIPTION OF REFERENCE NUMERALS AND SIGNS

1: THREE-VALUED SIGNAL GENERATION DEVICE
2: LFPS GENERATION UNIT
2a: LOGIC CIRCUIT UNIT
2b: FIRST DIFFERENTIAL AMPLIFICATION UNIT
2c: SECOND DIFFERENTIAL AMPLIFICATION UNIT
3: SIGNAL SYNTHESIS UNIT
3a: FIRST SIGNAL SYNTHESIS UNIT
3b: SECOND SIGNAL SYNTHESIS UNIT
11: PATTERN GENERATOR
W: OBJECT TO BE MEASURED (DUT)

What is claimed is:

1. A three-valued signal generation device that generates a three-valued Low Frequency Periodic Signaling (LFPS) signal by using a pseudo LFPS signal which is a two-valued Non Return to Zero (NRZ) signal and a two-valued enable signal corresponding to a burst section of the three-valued LFPS signal having voltage levels of a low level, a high level, and an intermediate level, the three-valued signal generation device comprising:
a first differential amplifier that includes:
a first enable terminal to which the enable signal is input,
a first input terminal to which the pseudo LFPS signal is input, a first output terminal from which a first differential signal is output, and a first inverted output terminal from which a first inverted differential signal obtained by inverting a voltage level of the first differential signal is output, a logic of the first differential signal being same as a logic of the pseudo LFPS signal based on a reference voltage of the pseudo LFPS signal when the enable signal is at a disable logic level, and the logic of the first differential signal being at a positive logic level regardless of the logic of the pseudo LFPS signal when the enable signal is at an enable logic level;

a second differential amplifier that includes:

a second enable terminal to which the enable signal is input, a second input terminal to which the pseudo LFPS signal is input, a second output terminal from which a second differential signal is output, and a second inverted output terminal from which a second inverted differential signal obtained by inverting a voltage level of the second differential signal is output, a logic of the second differential signal being same as a logic of an inverted pseudo LFPS signal, which is obtained by inverting a voltage level of the pseudo LFPS signal, based on the reference voltage of the pseudo LFPS signal when the enable signal is at a disable logic level, and the logic of the second differential signal being at a positive logic level regardless of the logic of the pseudo LFPS signal when the enable signal is at an enable logic level;

a first signal synthesis unit that synthesizes the first differential signal from the first differential amplifier and the second inverted differential signal from the second differential amplifier to perform positive logic output of the three-valued LFPS signal; and a second signal synthesis unit that synthesizes the first inverted differential signal from the first differential amplifier and the second differential signal from the second differential amplifier to perform negative logic output of the three-valued LFPS signal.

2. The three-valued signal generation device according to claim 1,
wherein each of the first differential amplifier and the second differential amplifier is a differential amplification circuit with an output enable function.

3. The three-valued signal generation device according to claim 1,
wherein each of the first signal synthesis unit and the second signal synthesis unit is a power combiner.

4. A three-valued signal generation method of generating a three-valued Low Frequency Periodic Signaling (LFPS) signal by using a pseudo LFPS signal which is a two-valued Non Return to Zero (NRZ) signal and a two-valued enable signal corresponding to a burst section of the three-valued LFPS signal having voltage levels of a low level, a high level, and an intermediate level, the three-valued signal generation method comprising:

inputting the enable signal to a first enable terminal of a first differential amplifier;

inputting the pseudo LFPS signal to a first input terminal of the first differential amplifier;

outputting a first differential signal from a first output terminal of the first differential amplifier, a logic of the first differential signal being same as a logic of the pseudo LFPS signal when the enable signal is at a disable logic level, and the logic of the first differential signal being at a positive logic level regardless of the logic of the pseudo LFPS signal when the enable signal is at an enable logic level;

outputting a first inverted differential signal, which is obtained by inverting a voltage level of the first differential signal, from a first inverted output terminal of the first differential amplifier;

inputting the enable signal to a second enable terminal of a second differential amplifier;

inputting the pseudo LFPS signal to a second input terminal of the second differential amplifier;

outputting a second differential signal from a second output terminal of the second differential amplifier, a logic of the second differential signal being same as a logic of an inverted pseudo LFPS signal, which is obtained by inverting a voltage level of the pseudo LFPS signal, based on the reference voltage of the pseudo LFPS signal when the enable signal is at a disable logic level, and the logic of the second differential signal at a positive logic level regardless of the logic of the pseudo LFPS signal when the enable signal is at an enable logic level;

outputting a second inverted differential signal, which is obtained by inverting a voltage level of the second differential signal, from a second inverted output terminal of the second differential amplifier;

synthesizing the first differential signal from the first differential amplifier and the second inverted differential signal from the second differential amplifier to perform positive logic output of the three-valued LFPS signal; and synthesizing the first inverted differential signal from the first differential amplifier and the second differential signal from the second differential amplifier to perform negative logic output of the three-valued LFPS signal.

* * * * *